3,767,810
METHOD OF INDUCING ANOREXIA
Abdulmuniem H. Abdallah, Midland, Mich., assignor to
The Dow Chemical Company, Midland, Mich.
No Drawing. Filed May 17, 1972, Ser. No. 254,216
Int. Cl. A61k 27/00
U.S. Cl. 424—309                                    3 Claims

ABSTRACT OF THE DISCLOSURE

Method for combatting and curbing the appetite through the use of α-2-(3,4-dichlorophenyl)-3-(dimethylamino)butyl cinnamate and pharmaceutically acceptable salts thereof.

BACKGROUND OF THE INVENTION

This invention relates to methods for controlling and curbing the appetite. More specifically, it relates to the use of α-2-(3,4-dichlorophenyl)-3-(dimethylamino)butyl cinnamate and pharmaceutically acceptable salts thereof to induce anorexia.

Obesity is a fairly common condition and a potentially serious one in view of the correlation between incidence of various diseases and the degree to which a person is overweight. For example, obese persons succumb statistically more frequently to cardiovascularrenal disease than do persons of normal weight. Obesity likewise results in higher death rates from diabetes, nephritis, pneumonia, cirrhosis, appendicitis, and postoperative complications. Since most cases of obesity are caused simply by an excessive intake of calories, good management of the condition can be achieved by restricting the calorie intake. Frequently, however, the patient rejects dietary restrictions, making it necessary to resort to anorexigenic drugs as adjuvants to therapy.

Most anorexigenic drugs are to a great degree central nervous system (CNS) stimulants, and although they may be effective anorexigents, the undesirable side effects caused by the CNS activity make the use of these agents undesirable. It would be very desirable indeed if the art could provide agents which exhibit anorectic effect but which possess little or no undesirable CNS activity. It is an object of this invention to provide such an agent. It is a further object to provide compositions containing α-2-(3,4-dichlorophenyl)-3-(dimethylamino)butyl cinnamate for use in curbing the appetite.

SUMMARY OF THE INVENTION

In accordance with the present invention, it has been discovered that α-2-(3,4-dichlorophenyl)-3-(dimethylamino)butyl cinnamate depicted structurally as

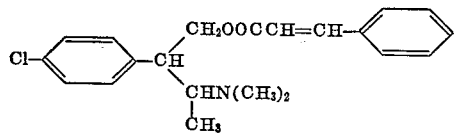

and salts thereof with pharmaceutically acceptable acids has the ability to induce anorexia when administered to a host animal. For the purpose of brevity, the above compound will hereinafter be referred to as the "cinnamate" compound. The appetite of a host is controlled through the administration of the active cinnamate compound in a dosage formulation in which the active ingredient is present in an anorectic amount. To achieve optimum effect, it is preferred that the dosage form be administered before each meal, thus providing an active ingredient daily dosage level of from about 25 to about 300 mg., and preferably from about 50 to about 250 mg.

It has been found that the active cinnamate and the pharmaceutically acceptable salts thereof have potent anorectic or anorexigenic properties. The active cinnamate compound has relatively little or no stimulant effect on the central nervous system (CNS) at dosages consistent with good anorectic activity.

As employed herein, the phrase "pharmaceutically-acceptable salt" refers to acid addition salts of the cinnamate compound, the anions of which are relatively nontoxic and innocuous to animals at dosages consistent with good anorectic activity so that side effects ascribable to the anions do not vitiate the beneficial effects of the cinnamate compound. Suitable pharmaceutically-acceptable salts which can be employed in the methods and composition of the invention include those derived from mineral acids such as the hydrochloride, hydrobromide, phosphate, nitrate and sulfate salts, those derived from organic carboxylic acids such as the succinate, tartrate, citrate, malate, maleate, and acetate salts and those derived from organic sulfonic acids such as the methanesulfonate and toluenesulfonate salts. The active cinnamate compound is preferably employed in the form of pharmaceutically-acceptable salt and the preferred form is the hydrochloride salt.

In accordance with the method of the present invention, an anorectic amount of the cinnamate compound or a pharmaceutically-acceptable salt thereof is administered to a host animal. The administration of an anorectic amount of cinnamate compound to an animal brings about a suppression of appetite in the animal. The method of the invention can thus be employed to reduce symptoms and responses to hunger in mammals exhibiting the same, and in reducing food intake by such animals as in reducing or controlling the weight thereof. The method of the invention is advantageously employed by administration of the anorectic amount of cinnamate compound to a hungry animal, that is, an animal which is predisposed to ingest food due to such factors as training or habituation to a schedule of feeding, duration of time elapsed since previous feeding (starvation), reduced blood sugar levels and/or gastrointestinal motility associated with hunger, stimuli such as scent or sight of food, and the like. Anorexia or suppressed appetite resulting from administration of the required dosage of such compound is usefully manifested by decreased food intake when the treated animal is presented with food during a period in which the appetite of such animal is suppressed by the method of the invention, in the absence of observable side effects or discomfort to the treated animal. Such reduction in food intake, as compared to normal food intake by the same or similar animals, can be utilized in bringing about a desired weight loss or controlling undesired weight gain while alleviating physical discomfort of hunger associated with such decreased food intake.

The anorectic amount of compound, that is, the amount of the cinnamate compound sufficient to produce reduced appetite or reduced food intake depends on various factors such as the size, type and age of the animal to be treated, the pharmaceutically-acceptable salt employed, the route of administration, the duration of anorectic effect desired, the time the compound is administered relative to prior and subsequent presentation of food, or established feeding patterns or schedules; provided, however, that the animal is administered sufficient of the active cinnamate compound to provide a substantial reduction in the appetite as indicated by reduction in food intake.

Generally, anorexia is induced in a host animal by the oral administration of from about 1 to about 250 or more milligrams of the cinnamate compound per kilogram of animal body weight. When administered by intraperitoneal injection, good results are obtained with an anorectic amount of from 1 to about 100 or more milligrams of cinnamate compound per kilogram of animal body weight.

In order to provide adequate dosage forms, the present invention contemplates incorporating the active cinnamate compound in solid or liquid unit dosage forms such as tablets, capsules, lozenges, elixirs, syrups, suspensions and the like, or in other forms readily subdividable into unit dosage forms using conventional inert pharmaceutical adjuvant materials which will be immediately apparent to those skilled in the art. The active cinnamate compound can also be formulated in conventional timed release capsule or tablet formulations, in which case the preferred dosage per unit is from about 50 milligrams or less to about 300 milligrams or more per unit.

In practicing the method of the invention, the active ingredient is preferably incorporated in a composition comprising a pharmaceutical carrier and from about 5 to about 90 percent by weight of the cinnamate compound or a pharmacologically-acceptable salt thereof. The term "pharmaceutical carrier" refers to known pharmaceutical adjuvants useful in formulation pharmacologically-active compounds for internal administration to animals, and which are substantially non-toxic and non-sensitizing under conditions of use. The compositions can be prepared by known techniques for the preparation of tablets, capsules, lozenges, troches, elixirs, syrups, emulsions, dispersions, wettable and effervescent powders, sterile injectable compositions, sterile parenteral compositions for implantation, and the like, and can contain suitable adjuvants known to be useful in the preparation of the particular type of composition desired. The compositions are then administered to animals and in particular to obese mammals or to mammals having a tendency toward obesity in an amount sufficient to constitute dosage of said animal with an anorectic amount of the active compound.

Suitable pharmaceutical adjuvants which can be employed in formulating solid compositions include lactose, glucose, gelatin, rice flour, starch, malt, magnesium carbonate, magnesium stearate and the like and compatible mixtures thereof. Liquid adjuvants or carriers which can be employed in preparing liquid compositions include ethanol, propylene glycol, water, glycerine, normal saline, glucose syrup, syrup of acacia, mucilage of tragacanth and the like and compatible mixtures thereof. Oil-in-water and water-in-oil emulsions can be prepared with edible oils such as peanut oil, wheat germ oil, corn oil, arachis oil, olive oil or the like and with the aid of emulsifying agents such as lecithin, sorbitan trioleate, polyoxyethylene sorbitan monooleate, gum acacia and the like. Suspensions can be prepared with the aid of suspending agents such as methyl cellulose, carboxymethyl cellulose, hydroxypropylmethyl cellulose and polyethyleneoxide condensation products with alkylphenols, fatty acids or fatty alcohols and the like and compatible mixtures thereof. Preferred compositions contain either a suspending agent or an emulsifying agent, or both. The compositions can also contain sweetening agents such as sugar or sodium saccharin, flavoring agents such as sugar or sodium saccharin, flavoring agents such as licorice, coloring materials such as caramel, preservatives and the like. The active ingredient can also be incorporated in sterile parenteral compositions for intraperitoneal, intramuscular, intravenous or subcutaneous injection. Such compositions are preferably prepared with pharmaceutical carriers such as water, normal saline and the sterile injectable suspensions can also include suspending agents such as those listed above.

DESCRIPTION OF PREFERRED EMBODIMENTS

The following examples illustrate the invention but are not to be construed as limiting the same.

Example 1

A sterile injectable composition comprising α-2-(3,4-dichlorophenyl)-3-(dimethylamino)butyl cinnamate hydrochloride in a 0.5 percent aqueous hydroxypropyl methyl cellulose suspension was prepared and administered to a group of mice. The compounds were administered at various dosage rates (i.e., 10, 21 and 46 mg./kg.) by intraperitoneal injection. Prior to administration of the cinnamate compound, the mice have been trained to eat a conventional rodent chow during a six hour period daily, the mice being presented with water ad libitum, but no food during the remaining 18 hours each day. The cinnamate compound is administered about 17 to 18 hours following the end of the latest feeding period. After administration of the compound, the mice in the group are presented with a weighed amount of rodent chow. Separate groups of similar mice are similarly trained, starved and presented with food to serve as a check. However, the check groups are administered only a 0.5 percent aqueous hydroxypropyl methyl cellulose suspension containing no cinnamate compound. Feed consumption by the groups of mice is determined after one hour and three hours, respectively, by weighing the rodent chow remaining at such times, and recording the difference in weight between feed presented and feed remaining as food consumption or food intake. By comparing the average group food intake of the control mice with the average group food intake of the treated mice, the percent reduction of food intake in the treated mice is calculated. The percent reduction of food intake obtained in the treated mice at the dosage rates of 10, 21 and 46 mg./kg. after 1 hour was 32, 39 and 58 percent, respectively, while the percent reduction for the same dosage rates after three hours was 19, 21 and 48 percent, respectively.

Example 2

In procedures similar to those in Example 1, separate test groups of mice are administered α-2-(3,4-dichlorophenyl)-3-(dimethylamino)butyl cinnamate hydrochloride orally at various dosage rates. Feed consumption by the treated groups and control groups of mice is determined after one and three hours, respectively, and the percent reduction of food intake in the treated mice is determined. The percent reduction of food intake in the treated mice obtained at the various dosage rates of acetophenone compound employed after one and three hours, respectively, is set forth in the following table:

TABLE I

| Run No. | Treatment | Dose (mg./kg.) | Percent reduction of food intake | |
|---|---|---|---|---|
| | | | 1 hour | 3 hours |
| 1(a) | α-2-(3,4-dichlorophenyl)-3-(dimethylamino)butyl cinnamate hydrochloride. | 10 | 21 | 10 |
| 1(b) | do | 21 | 28 | 7 |
| 1(c) | do | 46 | 56 | 18 |
| 1(d) | do | 100 | 94 | 57 |
| 2(a) | do | 21 | 33 | 2 |
| 2(b) | do | 46 | 45 | 11 |
| 2(c) | do | 100 | 71 | 26 |
| 3(a) | do | 21 | 35 | 10 |
| 3(b) | do | 46 | 28 | 6 |
| 3(c) | do | 100 | 71 | 33 |

Example 3

Cinnamoyl chloride (24 grams) in 150 milliliters of dioxane is added to a previously prepared solution of ethyl 2-(3,4-dichlorophenyl) - 3 - dimethylaminobutyrate (19 grams) and triethylamine (14.4 grams) in 75 milliliters of dioxane and the resulting reaction mixture is refluxed for about two hours. After standing overnight, the triethylamine hydrochloride is filtered off and the solution concentrated to a small volume. A solution of hydrogenchloride in diethylether is added and the crude product precipitate formed upon the addition is collected and dissolved in about 30 milliliters of hot isopropanol. After standing for about 10 days in a refrigerator, a solid precipitate is recovered by filtration. The filtrate is evaporated to dryness and the residue taken up twice with 200 milliliter portions of diethylether. After decantation, the solid product is recovered and dissolved in 100 milliliters of hot dioxane. The dioxane solution is cooled and about 100 milliliters of diethylether added thereto. A crystalline solid which precipitates is redissolved in 70 milliliters of isopropanol and again precipitated by the addition of diethylether. As a result of these operations, the hydrochloride of the desired α-2-(3,4-dichlorophenyl)-3-(dimethylamino)butyl cinnamate product is recovered as a white crystalline solid melting at about 105–110° C.

I claim:

1. A method for curbing appetite which comprises administering to a host in need thereof, an anorectic amount of a compound of the formula:

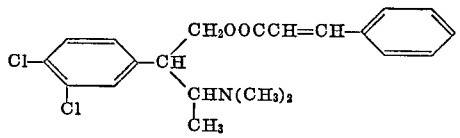

or a pharmaceutically acceptable salt thereof.

2. The method of claim 1 which comprises administering a dose in the range of from about 1 to about 250 milligrams per kilogram of animal body weight.

3. The method of claim 1 in which the compound administered is α-2-(3,4-dichlorophenyl)-3-(dimethylamino)butyl cinnamate hydrochloride.

References Cited
UNITED STATES PATENTS
2,954,373   9/1960   Shapiro et al. _____ 260—477

ALBERT T. MEYERS, Primary Examiner
N. A. DREZIN, Assistant Examiner

U.S. Cl. X.R.
424—360

UNITED STATES PATENT OFFICE
CERTIFICATE OF CORRECTION

Patent No. 3,767,810     Dated October 23, 1973

Inventor(s) Abdulmuniem H. Abdallah

It is certified that error appears in the above-identified patent and that said Letters Patent are hereby corrected as shown below:

Column 1, line 55, the formula should appear as follows:

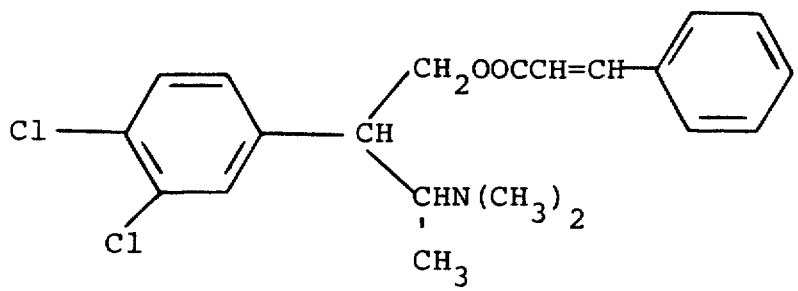

Column 3, line 22, "formulation" should read -- formulating --.

Signed and sealed this 17th day of September 1974.

SEAL)
ttest:

cCOY M. GIBSON JR.
ttesting Officer

C. MARSHALL DANN
Commissioner of Patents